US012812107B2

(12) United States Patent
Hsiang et al.

(10) Patent No.: US 12,812,107 B2
(45) Date of Patent: Nov. 24, 2026

(54) ADAPTIVE CODING IMAGE AND VIDEO DATA

(71) Applicant: MEDIATEK INC., Hsinchu City (TW)

(72) Inventors: Shih-Ta Hsiang, Hsinchu City (TW); Tzu-Der Chuang, Hsinchu City (TW); Chun-Chia Chen, Hsinchu City (TW); Chih-Wei Hsu, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/866,161

(22) PCT Filed: May 24, 2023

(86) PCT No.: PCT/CN2023/096022
§ 371 (c)(1),
(2) Date: Nov. 15, 2024

(87) PCT Pub. No.: WO2023/236775
PCT Pub. Date: Dec. 14, 2023

(65) Prior Publication Data

US 2025/0310526 A1 Oct. 2, 2025

Related U.S. Application Data

(60) Provisional application No. 63/349,177, filed on Jun. 6, 2022.

(51) Int. Cl.

| | |
|---|---|
| ***H04N 19/119*** | (2014.01) |
| ***H04N 19/176*** | (2014.01) |
| ***H04N 19/70*** | (2014.01) |

(52) U.S. Cl.
CPC ......... *H04N 19/119* (2014.11); *H04N 19/176* (2014.11); *H04N 19/70* (2014.11)

(58) Field of Classification Search
CPC ..... H04N 19/119; H04N 19/176; H04N 19/70
(Continued)

(56) References Cited

U.S. PATENT DOCUMENTS

| | | | |
|---|---|---|---|
| 11,910,027 | B2 | 2/2024 | Gao |
| 2018/0103268 | A1 | 4/2018 | Huang |

(Continued)

FOREIGN PATENT DOCUMENTS

| | | |
|---|---|---|
| CN | 112673626 A | 4/2021 |

OTHER PUBLICATIONS

International Search Report and Written Opinion dated Sep. 6, 2023, issued in application No. PCT/CN2023/096022.

*Primary Examiner* — Justin W Rider
(74) *Attorney, Agent, or Firm* — McClure, Qualey & Rodack, LLP

(57) ABSTRACT

A method for applying localized partitioning constraints when coding a video picture. A video coder receives data as a current block of a plurality of blocks in a current picture of a video. The current block maybe a coding tree unit (CTU) or a local control unit (LCU). A set of constraints are adaptive to different LCUs in the current picture. The particular split type is one of quad-tree (QT) splitting, multi-type tree (MTT) splitting, ternary-tree (TT) splitting, and binary-tree (BT) splitting. The video coder signals or receives a maximum depth of a particular split type that is localized to the current block. The video coder constrains a partitioning operation of any of a plurality of blocks within the current block according to the signaled or received maximum depth for the particular split type. The video coder encodes or decodes the current block based on the constrained partitioning operation.

16 Claims, 10 Drawing Sheets

(58) Field of Classification Search
USPC ...................................................... 375/240.02
See application file for complete search history.

(56) References Cited

U.S. PATENT DOCUMENTS

| | | | |
|---|---|---|---|
| 2018/0199072 | A1 | 7/2018 | Li |
| 2021/0329233 | A1 | 10/2021 | Tsai |
| 2021/0368185 | A1 | 11/2021 | Zhang |

ADAPTIVE CODING IMAGE AND VIDEO DATA

CROSS REFERENCE TO RELATED PATENT APPLICATION(S)

The present disclosure is part of a non-provisional application that claims the priority benefit of U.S. Provisional Patent Application No. 63/349,177, filed on 6 Jun. 2022. Content of above-listed application is herein incorporated by reference.

TECHNICAL FIELD

The present disclosure relates generally to video coding. In particular, the present disclosure relates to methods of partitioning a video picture for coding.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for applying localized partitioning constraints when coding a video picture. A video coder receives data to be encoded or decoded as a current block of a plurality of blocks in a current picture of a video. The current block maybe a coding tree unit (CTU) or a local control unit (LCU). A set of constraints are adaptive to different LCUs in the current picture. The particular split type is one of quad-tree (QT) splitting, multi-type tree (MTT) splitting, ternary-tree (TT) splitting, and binary-tree (BT) splitting. The video coder signals or receives a maximum depth of a particular split type that is localized to the current block. The video coder constrains a partitioning operation of any of a plurality of blocks within the current block according to the signaled or received maximum depth for the particular split type. The partitioning operation may be a split operation of the particular split type, such that the split operation is disallowed when the maximum depth for the particular split type is reached.

In some embodiments, when the maximum depth for the particular split type is reached at a current split-partition of the current block, further splitting by the particular split type is inferred to be disabled for the current split-partition and a syntax element for selecting the particular split type is bypassed for the current split-partition. For example, when the particular split type is QT splitting and the maximum depth for the QT splitting is reached at a current split-partition, a syntax element for splitting the current split-partition into QT partitions is bypassed and inferred to be disallowing the splitting.

In some embodiments, when a maximum depth for MTT splitting is zero, a syntax element for splitting a current split partition of the current block into QT partitions (e.g., split_qt_flag) is bypassed and inferred to activate the QT splitting when the current split-partition is determined to be further split. In some embodiments, when the particular split type is MTT splitting and a maximum depth for MTT splitting is reached for a current split-partition, a syntax element for splitting the current split-partition into multiple partitions is bypassed and inferred to be disallowing the splitting. In some embodiments, when a current depth of MTT splitting is greater than zero in the current block, a syntax element for indicating maximum BT or TT depth for the current block is signaled. In some embodiments, a flag for selecting between BT or TT splitting (e.g., mtt_split_cu_binary_flag) is bypassed when a maximum depth of BT or TT is reached at a current split partition of the current block.

In some embodiments, when a current depth of MTT splitting is greater than zero in the current block, a syntax element for indicating whether vertical or horizontal splitting is allowed (e.g., mtt_split_cu_vertical_flag) is signaled. In some embodiments, the syntax element for indicating MTT vertical or horizontal splitting is bypassed when vertical splitting or horizontal splitting of a current split partition is not allowed for the current block.

In some embodiments, after a MTT splitting is encountered or performed for the current block, the encoder signals a syntax element (e.g., ctu_used_tt_flag) to indicate whether ternary tree (TT) splitting is used or allowed in the current block. In some embodiments, when TT splitting is indicated by the syntax element (e.g., ctu_used_tt_flag) to not be used for the current block, a flag for indicating whether to perform binary tree (BT) splitting (e.g., mtt_split_cu_binary_flag) is bypassed.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Block Partitioning

Figure 1:
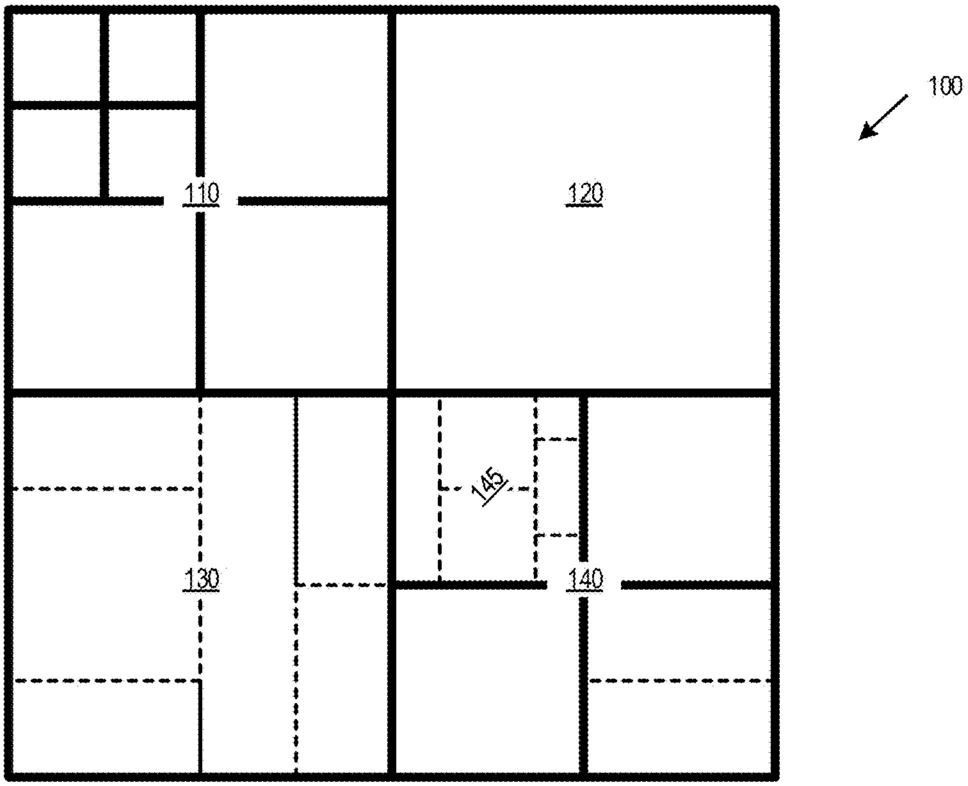
FIG. 1 provides an example coding tree unit (CTU) that is recursively partitioned by quad-tree QT with nested multi-type tree (MTT).

A CTU can be partitioned into one or multiple non-overlapped coding units (CUs) using the quadtree (QT) with nested multi-type-tree (MTT) structure to adapt to various local motion and texture characteristics. FIG. 1 provides an example CTU 100 that is recursively partitioned by QT with nested MTT. In the figure, the bold solid edges represent quadtree partitioning and the broken edges represent multi-type tree (MTT) partitioning. As illustrated, the CTU 100 is partitioned by QT into CUs 110, 120, 130, and 140. The CU 110 is further partitioned by QT. The CU 120 is not further partitioned. The CU 130 is further partitioned by MTT. The CU 140 is further partitioned by QT and then by MTT.

Figure 2:
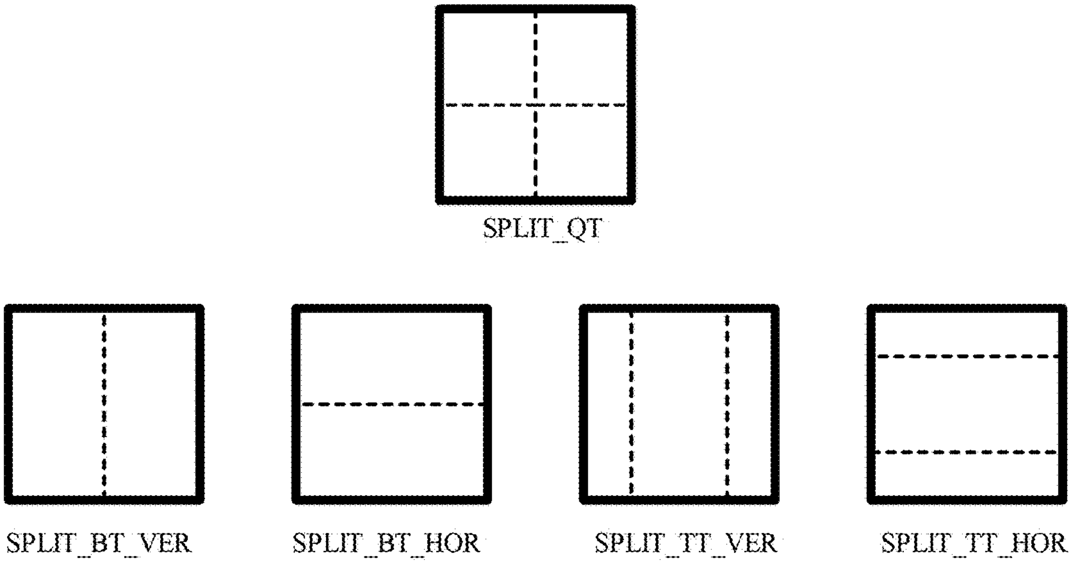
FIG. 2 illustrates the five split types of a coding unit (CU), including by QT partitioning and by MTT partitioning.

FIG. 2 illustrates the five split types of a CU, including by QT partitioning and by MTT partitioning. As illustrated, the CU can be further split into smaller CUs by using QT partitioning (SPLIT_QT), or by using one of the four MTT partitioning types: vertical binary partitioning (SPLIT_BT_VER), horizontal binary partitioning (SPLIT_BT_HOR), vertical ternary partitioning (SPLIT_TT_VER), horizontal ternary partitioning (SPLIT_TT_HOR).

The following parameters are defined for the quadtree with nested multi-type tree coding tree scheme. These parameters are specified by sequence parameter set (SPS) syntax elements and can be further refined by picture header syntax elements.

CTUsize: the root node size of a quaternary tree

MinQTSize: the minimum allowed quaternary tree leaf node size

MaxBtSize: the maximum allowed binary tree root node size.

MaxTtSize: the maximum allowed ternary tree root node size.

Figure 3:
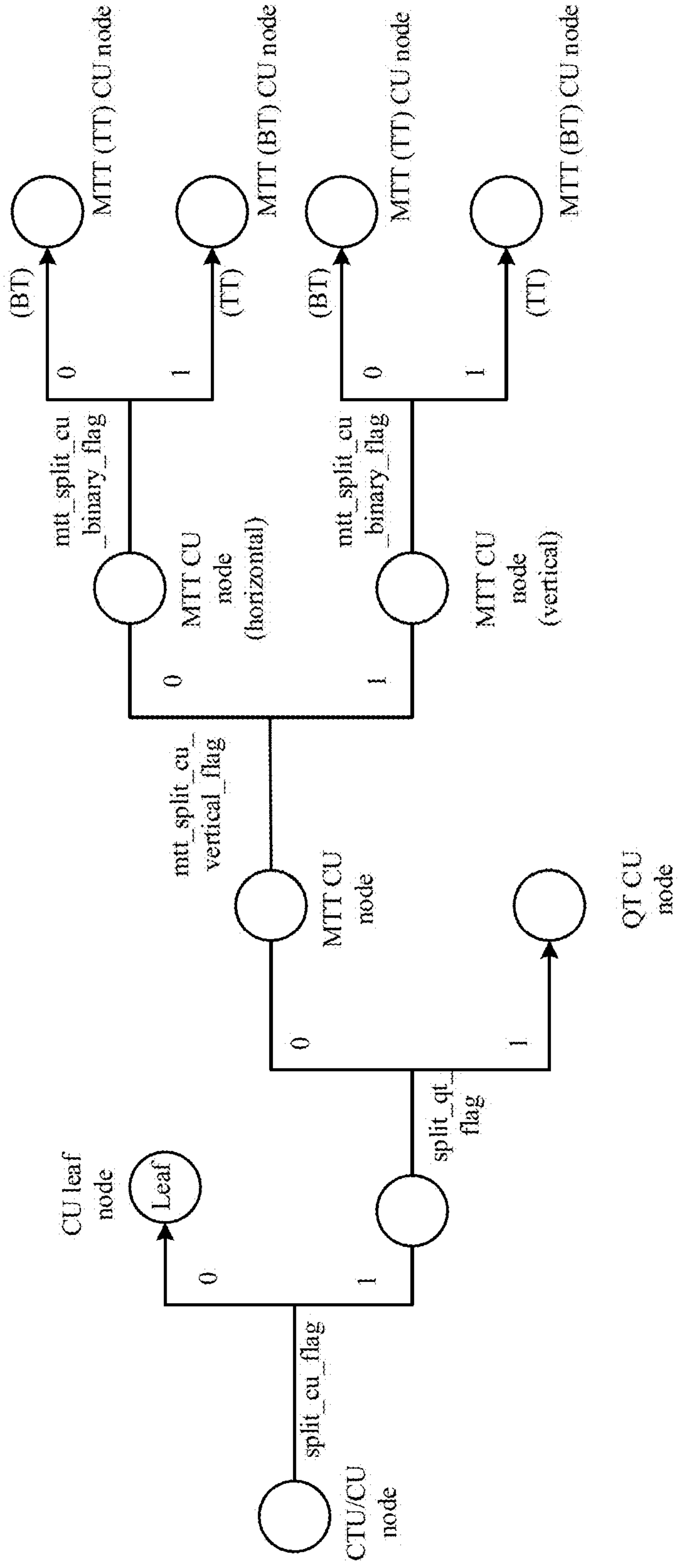
FIG. 3 illustrates the signaling mechanism of the partition splitting information, specifically for QT with nested MTT coding tree structure.

MaxMttDepth: the maximum allowed hierarchy depth of multi-type tree splitting from a quadtree leaf MinCbSize: the minimum allowed coding block node size A coding tree unit (CTU) is treated as the root of a quaternary tree (or quadtree) and is first partitioned by a quaternary tree structure. Each quaternary tree leaf node (when sufficiently large to allow it) is then further partitioned by a multi-type tree structure. FIG. 3 illustrates the signaling mechanism of the partition splitting information, specifically for quadtree with nested multi-type tree coding tree structure. The figure illustrates splitting flags that are used to indicate the partition tree structure of a block. Specifically, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as below:

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

II. Adaptive Coding for Partitioning

A. Local Control Units

The sequence parameter set (SPS) and the picture parameter set (PPS) contain high-level syntax elements that apply to entire coded video sequences and pictures, respectively. The picture header (PH) and slice header (SH) contain high-level syntax elements that apply to a current coded picture and slice, respectively. Some embodiments of the disclosure provide a video coder that may divide a coded picture into non-overlapped local control units (LCUs). The video coder may encode or decode multiple syntax sets that apply to adopted coding tools for encoding or decoding the picture region corresponding to a current LCU. As such, the parameter values for the utilized coding tools can be adaptively adjusted from one LCU to another in a coded picture.

Figure 4:
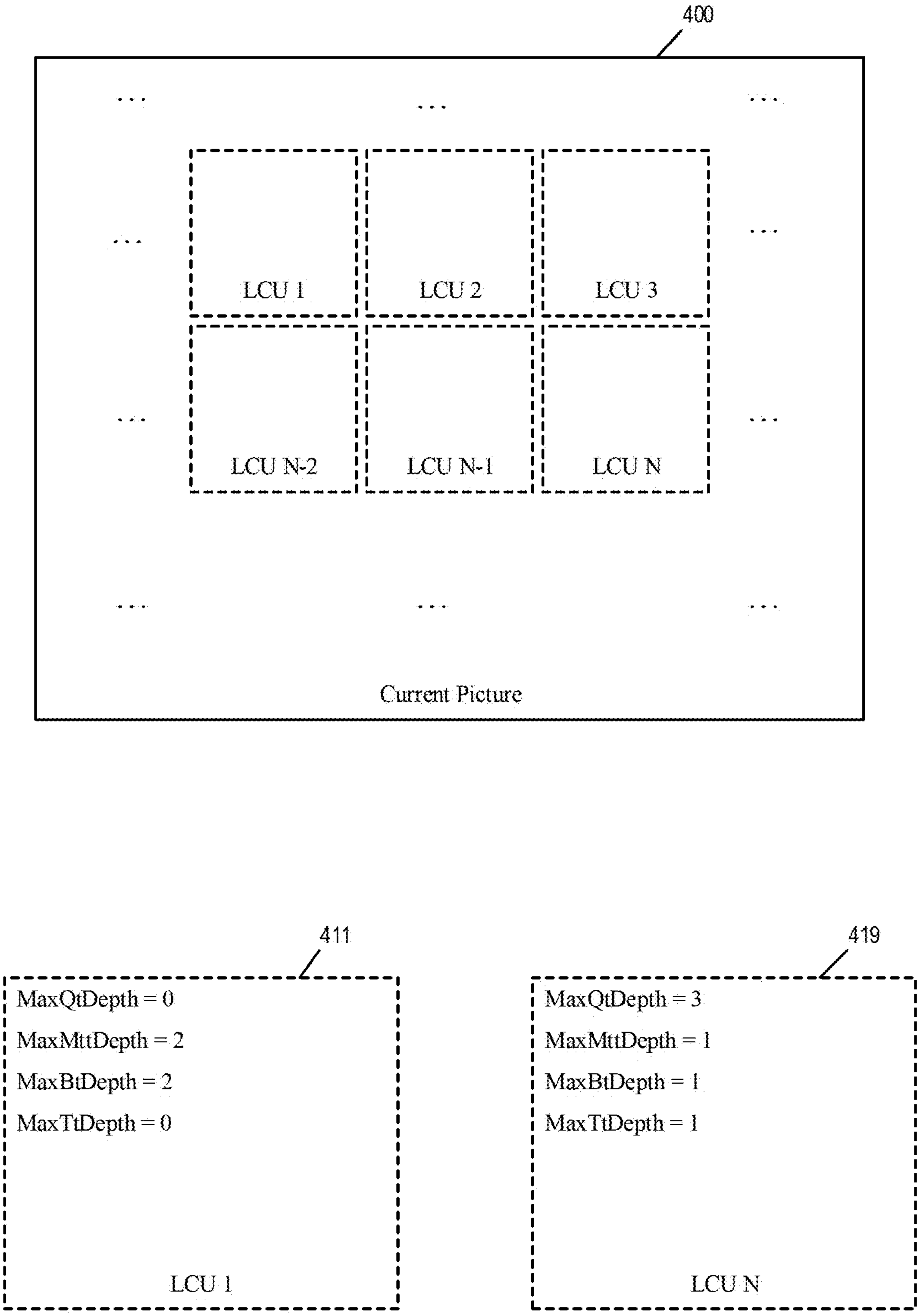
FIG. 4 conceptually illustrates syntax elements having parameter values that are adapted to multiple different local control units (LCUs) of a video picture.

FIG. 4 conceptually illustrates syntax elements having parameter values that are adapted to multiple different local control units (LCUs) of a video picture 400. As illustrated, the video picture 400 includes several LCUs, including LCU 411 (LCU 1) and LCU 419 (LCU N). The LCUs 411 and 419 both have syntax elements for constraining partitioning operations, syntax elements such as the maximum depths of QT splitting (MaxQtDepth), MTT splitting (MaxMttDepth), BT splitting (MaxBtDepth), and TT splitting (MaxTtDepth). The values of the syntax elements MaxQtDepth, MaxMttDepth, MaxBtDepth, and MaxTtDepth are localized and adapted to individual LCUs, and the instances of these syntax elements for these different LCUs have their own specified values. For example, MaxQtDepth of the LCU 411 has value of 0, while the MaxQtDepth of the LCU 419 has value of 3; MaxMttDepth of the LCU 411 has value of 2, while MaxMttDepth of the LCU 419 has value of 1, etc.

In some embodiments, each coded picture is divided into LCUs in alignment with the CTU grid in each coded picture. In some embodiments, each LCU corresponds to one or more consecutive CTUs according to a specified scan order. In some embodiments, each LCU corresponds to a group of MxN CTUs, where M and N are integers. In some embodiments, each LCU corresponds to one CTU. In some embodiment, each LCU corresponds to one or more CTU rows.

In some embodiments, the multiple syntax sets of a LCU may include syntax information related to one or more inter prediction tools. In some of these embodiments, the multiple syntax sets may include syntax information related to affine or local illumination compensation (LIC) tools. In some embodiments, the multiple syntax sets may include syntax information for indicating CU partitioning constraints enforced on encoding or decoding the picture region corresponding to a current LCU.

In some embodiments, each LCU corresponds just one CTU and a video coder may signal one or more syntax elements in a current CTU to indicate the maximum allowed QT depth, the maximum allowed BT depth, the maximum allowed TT depth, and/or the maximum allowed MTT depth for the current CTU. When the QT depth of a current coding tree node is equal to the maximum allowed QT depth of the current CTU derived from the multiple syntax elements, the current coding tree is not allowed to be further partitioned by QT split. The video coder may skip signaling the syntax information (e.g., split_qt_flag) for indicating whether a QT split is selected for further partitioning the current coding tree node in the current CTU. Similarly, when the MTT, BT, or TT depth of a current coding tree node is equal to the maximum allowed MTT, BT, or TT depth of the current CTU, the video coder may skip signaling the syntax information for indicating whether a MTT, BT, or TT split is selected for further partitioning the current coding tree node in the current CTU.

In some embodiments, based on the quadtree with nested multi-type tree coding tree syntax, a video coder may further signal a syntax element ctu_max_qt_depth in a current CTU to indicate the maximum allowed QT depth for the current CTU. When the QT depth of a current coding tree node is equal to the maximum allowed QT depth of the current CTU and the current coding tree node is to be further split (with split_cu_flag=1), the video coder may skip signaling split_qt_flag (with an inferred value equal to 0) and the current coding tree node is inferred to be further split by MTT. The video coder may further signal a syntax element ctu_max_mtt_depth in a current CTU to indicate the maximum allowed MTT depth for the current CTU. When the maximum allowed MTT depth of the current CTU is equal to 0 and the current coding tree node is to be further split (with split_cu_flag=1), the video coder may skip signaling split_qt_flag (with an inferred value equal to 1) and the current coding tree node is inferred to be further split by QT. When the QT depth of a current coding tree node is equal to the maximum allowed QT depth of the current CTU and MTT split is disabled for the current coding tree node, the current coding tree cannot be further split and the video coder may skip signaling split_cu_flag with an inferred value equal to 0 for the current coding tree node. Similarly, when the MTT depth of a current coding tree node is equal to the maximum allowed MTT depth of the current CTU and QT split is disabled for the current coding tree node, the video coder may skip signaling split_cu_flag with an inferred value equal to 0 for the current coding tree node.

In some embodiments, a video coder may signal one or more syntax elements to indicate whether one or more CU partitioning modes are enabled or used for a current CTU. In one embodiment, a video coder may signal one CTU-level syntax element ctu_used_TT_flag in a current CTU to indicate whether the TT split is used in the current CTU or not. When the CTU-level syntax element indicates that TT split is not used in the current CTU, the video coder may skip signaling the syntax information (e.g., mtt_split_cu_binary_flag) for indicating whether TT is used for further partitioning a current coding tree node in the current CTU. In a further embodiment, ctu_used_TT_flag is signaled only after the first MTT split is encountered (e.g., with split_qt_flag equal to 0) in a current CTU. If MTT split is not used in the current CTU, ctu_used_TT_flag is not signaled and TT split is inferred to be not used in the current CTU. In this way, the bit cost for coding ctu_used_TT_flag in a CTU can be saved when the MTT split is not used in the CTU.

B. QP Adaptive MTT/QT Depth

In some embodiments, the video coder may determine the maximum allowed MTT and/or QT depth according to the quantization parameter (QP) specified for the corresponding picture region. The video coder may assign different maximum allowed MTT and/or QT depths for different QP ranges. The method for deriving the assigned maximum allowed MTT and/or QT depths for a specified QP can be pre-defined in a video coding system. Alternatively, the syntax information for deriving the assigned maximum allowed MTT and/or QT depths for a specified QP may be further signaled in the bitstream. In some embodiments, the syntax information for deriving the maximum allowed MTT and/or QT depths can be coded in one or more high-level syntax sets such as the SPS, PPS, PH, and SH. In some embodiments, the QP-adaptive determination of the maximum allowed MTT and/or QT depth can be turned on or off for different picture/slice/tile/CTU-row/CTU/VPDU, with the corresponding enable/disable control flags provided per picture/slice/tile/CTU-row/CTU/VPDU.

C. Adaptive CTU Size

In VVC, the CTU size is coded in a SPS and is utilized for the entire video sequences referring to the SPS. Some embodiments of the disclosure provide a method in which the CTU size may be allowed to be adaptive according to QP, temporal index (TID), and picture region. The syntax information for deriving the CTU size for a current picture region can be coded in one or more high-level syntax sets such as the SPS, PPS, PH, and SH. In some embodiments, the adaptive CTU size may be turned on or off for different picture/slice/tile/CTU-row/CTU/VPDU, with the corresponding enable/disable control flag provided per picture/slice/tile/CTU-row/CTU/VPDU.

D. Partial Split Modes

In some embodiments, a video coder may adaptively disable one or more split modes for further partitioning coding tree nodes in a coded picture. The video coder may further skip signaling syntax information related to the disabled one or more split modes. In this way, the video coder can disable rarely used split modes according to the video contents and save the bit costs associated with the disabled mode(s). In some embodiments, a video coder may signal one or more syntax elements in the PH, or SH to indicate one or more split modes in a current picture or slice are disabled.

Any of the foregoing proposed methods can be implemented in encoders and/or decoders. For example, any of the proposed methods can be implemented in a CU partitioning module of an encoder, and/or a CU partitioning module of a decoder. Alternatively, any of the proposed methods can be implemented as a circuit integrated to the CU partitioning module of the encoder and/or the CU partitioning module of the decoder. The proposed aspects, methods and related embodiments can be implemented individually or jointly in an image and video coding system.

XIXI. Example Video Encoder

Figure 5:
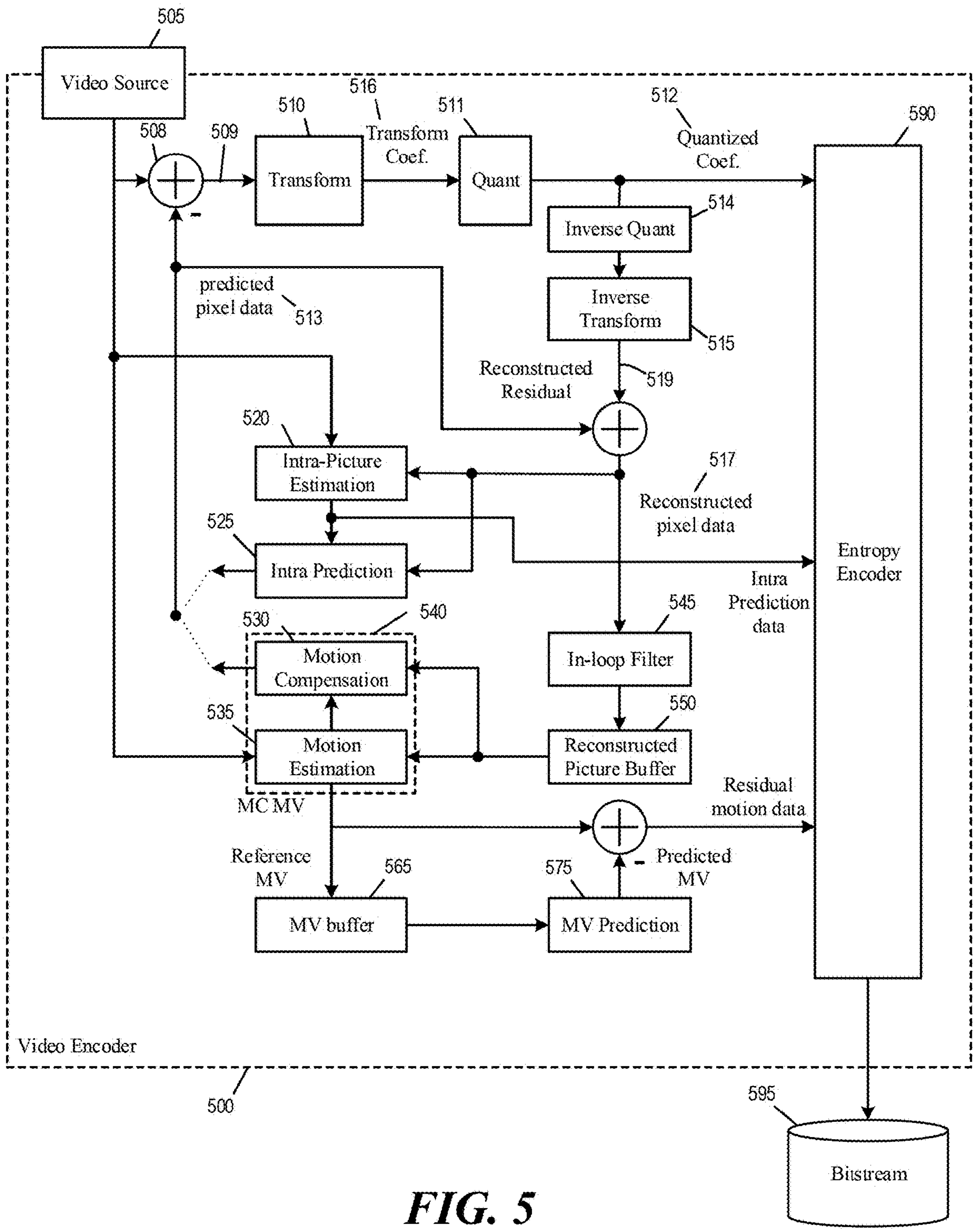
FIG. 5 illustrates an example video encoder that may implement block partitioning.

FIG. 5 illustrates an example video encoder 500 that may implement block partitioning. As illustrated, the video encoder 500 receives input video signal from a video source 505 and encodes the signal into bitstream 595. The video encoder 500 has several components or modules for encoding the signal from the video source 505, at least including some components selected from a transform module 510, a quantization module 511, an inverse quantization module 514, an inverse transform module 515, an intra-picture estimation module 520, an intra-prediction module 525, a motion compensation module 530, a motion estimation module 535, an in-loop filter 545, a reconstructed picture buffer 550, a MV buffer 565, and a MV prediction module 575, and an entropy encoder 590. The motion compensation module 530 and the motion estimation module 535 are part of an inter-prediction module 540.

In some embodiments, the modules 510-590 are modules of software instructions being executed by one or more processing units (e.g., a processor) of a computing device or electronic apparatus. In some embodiments, the modules 510-590 are modules of hardware circuits implemented by one or more integrated circuits (ICs) of an electronic apparatus. Though the modules 510-590 are illustrated as being separate modules, some of the modules can be combined into a single module.

The video source 505 provides a raw video signal that presents pixel data of each video frame without compression. A subtractor 508 computes the difference between the raw video pixel data of the video source 505 and the predicted pixel data 513 from the motion compensation module 530 or intra-prediction module 525 as prediction residual 509. The transform module 510 converts the difference (or the residual pixel data or residual signal 508) into transform coefficients (e.g., by performing Discrete Cosine Transform, or DCT). The quantization module 511 quantizes the transform coefficients into quantized data (or quantized coefficients) 512, which is encoded into the bitstream 595 by the entropy encoder 590.

The inverse quantization module 514 de-quantizes the quantized data (or quantized coefficients) 512 to obtain transform coefficients, and the inverse transform module 515 performs inverse transform on the transform coefficients to produce reconstructed residual 519. The reconstructed residual 519 is added with the predicted pixel data 513 to produce reconstructed pixel data 517. In some embodiments, the reconstructed pixel data 517 is temporarily stored in a line buffer (not illustrated) for intra-picture prediction and spatial MV prediction. The reconstructed pixels are filtered by the in-loop filter 545 and stored in the reconstructed picture buffer 550. In some embodiments, the reconstructed picture buffer 550 is a storage external to the video encoder 500. In some embodiments, the reconstructed picture buffer 550 is a storage internal to the video encoder 500.

The intra-picture estimation module 520 performs intra-prediction based on the reconstructed pixel data 517 to produce intra prediction data. The intra-prediction data is provided to the entropy encoder 590 to be encoded into bitstream 595. The intra-prediction data is also used by the intra-prediction module 525 to produce the predicted pixel data 513.

The motion estimation module 535 performs inter-prediction by producing MVs to reference pixel data of previously decoded frames stored in the reconstructed picture buffer 550. These MVs are provided to the motion compensation module 530 to produce predicted pixel data.

Instead of encoding the complete actual MVs in the bitstream, the video encoder 500 uses MV prediction to generate predicted MVs, and the difference between the MVs used for motion compensation and the predicted MVs is encoded as residual motion data and stored in the bitstream 595.

The MV prediction module 575 generates the predicted MVs based on reference MVs that were generated for encoding previously video frames, i.e., the motion compensation MVs that were used to perform motion compensation. The MV prediction module 575 retrieves reference MVs from previous video frames from the MV buffer 565. The video encoder 500 stores the MVs generated for the current video frame in the MV buffer 565 as reference MVs for generating predicted MVs.

The MV prediction module 575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 595 by the entropy encoder 590.

The entropy encoder 590 encodes various parameters and data into the bitstream 595 by using entropy-coding techniques such as context-adaptive binary arithmetic coding (CABAC) or Huffman encoding. The entropy encoder 590 encodes various header elements, flags, along with the quantized transform coefficients 512, and the residual motion data as syntax elements into the bitstream 595. The bitstream 595 is in turn stored in a storage device or transmitted to a decoder over a communications medium such as a network.

The in-loop filter 545 performs filtering or smoothing operations on the reconstructed pixel data 517 to reduce the artifacts of coding, particularly at boundaries of pixel blocks. In some embodiments, the filtering or smoothing operations performed by the in-loop filter 545 include deblock filter (DBF), sample adaptive offset (SAO), and/or adaptive loop filter (ALF).

Figure 6:
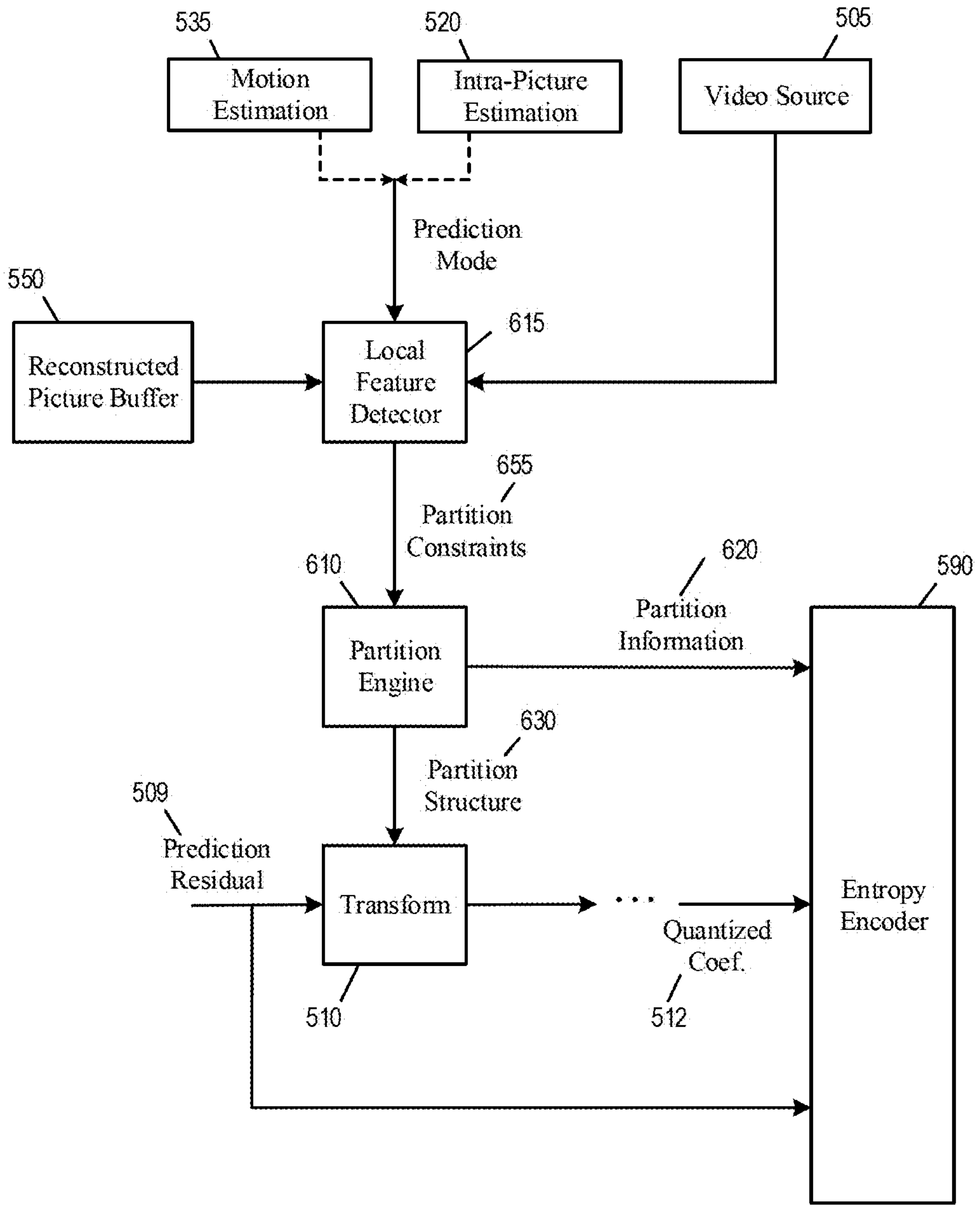
FIG. 6 illustrates portions of the video encoder that implement block partitioning based on localized partitioning constraint.

FIG. 6 illustrates portions of the video encoder 500 that implement block partitioning based on localized partitioning constraint. A partition engine 610 generates a set of partitioning information 620 for the entropy encoder 590. The entropy encoder 590 encodes or signals the set of partitioning information 620 as syntax elements into the bitstream 595 at different levels of video hierarchy (e.g., sequence, picture, slice, block). The partition engine 610 also provide partitioning structure 630 to the transform module 510 so the transform module may perform transform operations on prediction residual 509 according to the partitioning structure 630 to produce quantized coefficients 512.

The partition engine 610 may apply various partitioning constraints such as maximum depths for MTT, TT, BT, QT, etc. The partitioning operations performed by the partitioning engine 610 are subject to these partitioning constraints. The partitioning constraints are localized or adapted to individual LCUs of the current picture. The localized partitioning constraints may be provided by a local feature detector 615, which uses various information such as neighboring reconstructed pixels provided by the reconstructed picture buffer 550, inter- or intra-prediction modes provided by the motion estimation module 535 or the intra-picture estimation module 520, or the input video signal from the video source 505. The localized partitioning constraints may be included in the partition information 620 to be signaled in the bitstream 595 by the entropy encoder 590.

Figure 7:
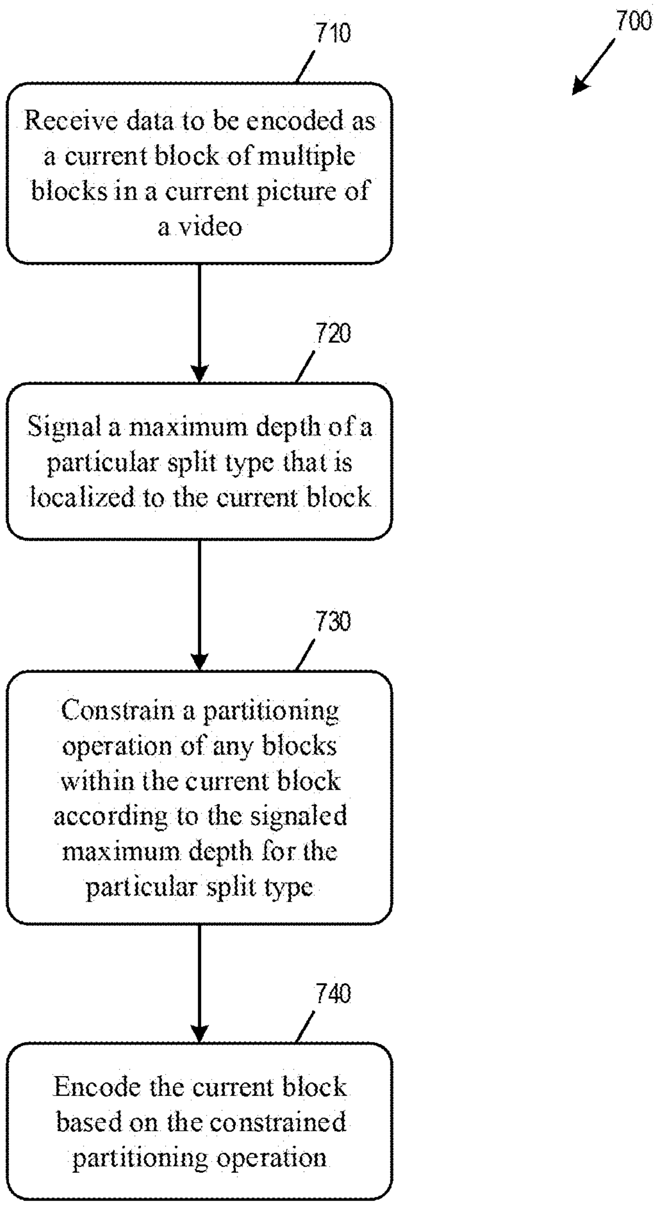
FIG. 7 conceptually illustrates a process that perform block partitioning based on localized partitioning constraints.

FIG. 7 conceptually illustrates a process 700 that perform block partitioning based on localized partitioning constraints. In some embodiments, one or more processing units (e.g., a processor) of a computing device implementing the encoder 500 performs the process 700 by executing instructions stored in a computer readable medium. In some embodiments, an electronic apparatus implementing the encoder 500 performs the process 700.

The encoder receives (at block 710) data to be encoded as a current block of a plurality of blocks in a current picture of a video. The current block maybe a coding tree unit (CTU). The current block may also be a local control unit (LCU).

The encoder signals (at block 720) a maximum depth of a particular split type that is localized to the current block. The particular split type is one of quad-tree (QT) splitting, multi-type tree (MTT) splitting, ternary-tree (TT) splitting, and binary-tree (BT) splitting. In some embodiments, the maximum depth of the particular split type is one of a set of constraints that are adaptive to different LCUs in the current picture.

The encoder constrains (at block 730) a partitioning operation of any of a plurality of blocks within the current block according to the signaled maximum depth for the particular split type. The partitioning operation is a split operation of the particular split type, such that the split operation is disallowed when the maximum depth for the particular split type is reached.

In some embodiments, when the maximum depth for the particular split type is reached at a current split-partition of the current block (e.g., a QT node or a MTT node), further splitting by the particular split type is inferred to be disabled for the current split-partition and a syntax element for selecting the particular split type is bypassed for the current split-partition. For example, when the particular split type is QT splitting and the maximum depth for the QT splitting is reached at a current split-partition, a syntax element for splitting the current split-partition into QT partitions is bypassed and inferred to be disallowing the splitting.

In some embodiments, when a maximum depth for MTT splitting is zero, a syntax element for splitting a current split partition of the current block into QT partitions (e.g., split_qt_flag) is bypassed and inferred to activate the QT splitting. In some embodiments, when the particular split type is MTT splitting and a maximum depth for MTT splitting is reached for a current split-partition, a syntax element for splitting the current split-partition into multiple partitions is bypassed and inferred to be disallowing the splitting. In some embodiments, when a current depth of MTT splitting is greater than zero in the current block, a syntax element for indicating maximum BT or TT depth for the current block is signaled. In some embodiments, a flag for selecting between BT or TT splitting (e.g., mtt_split_cu_binary_flag) is bypassed when a maximum depth of BT or TT is reached at a current split partition of the current block.

In some embodiments, when a current depth of MTT splitting is greater than zero in the current block, a syntax element for indicating whether vertical or horizontal splitting is allowed (e.g., mtt_split_cu_vertical_flag) is signaled. In some embodiments, the syntax element for indicating MTT vertical or horizontal splitting is bypassed when vertical splitting or horizontal splitting of a current split partition is not allowed for the current block.

In some embodiments, after a MTT splitting is encountered or performed for the current block, the encoder signals a syntax element (e.g., ctu_used_tt_flag) to indicate whether ternary tree (TT) splitting is used or allowed in the current block. In some embodiments, when TT splitting is indicated by the syntax element (e.g., ctu_used_tt_flag) to not be used for the current block, a flag for indicating whether to perform binary tree (BT) splitting (e.g., mtt_split_cu_binary_flag) is bypassed.

The encoder encodes (at block 740) the current block based on the constrained partitioning operation.

III. Example Video Decoder

In some embodiments, an encoder may signal (or generate) one or more syntax element in a bitstream, such that a decoder may parse said one or more syntax element from the bitstream.

Figure 8:
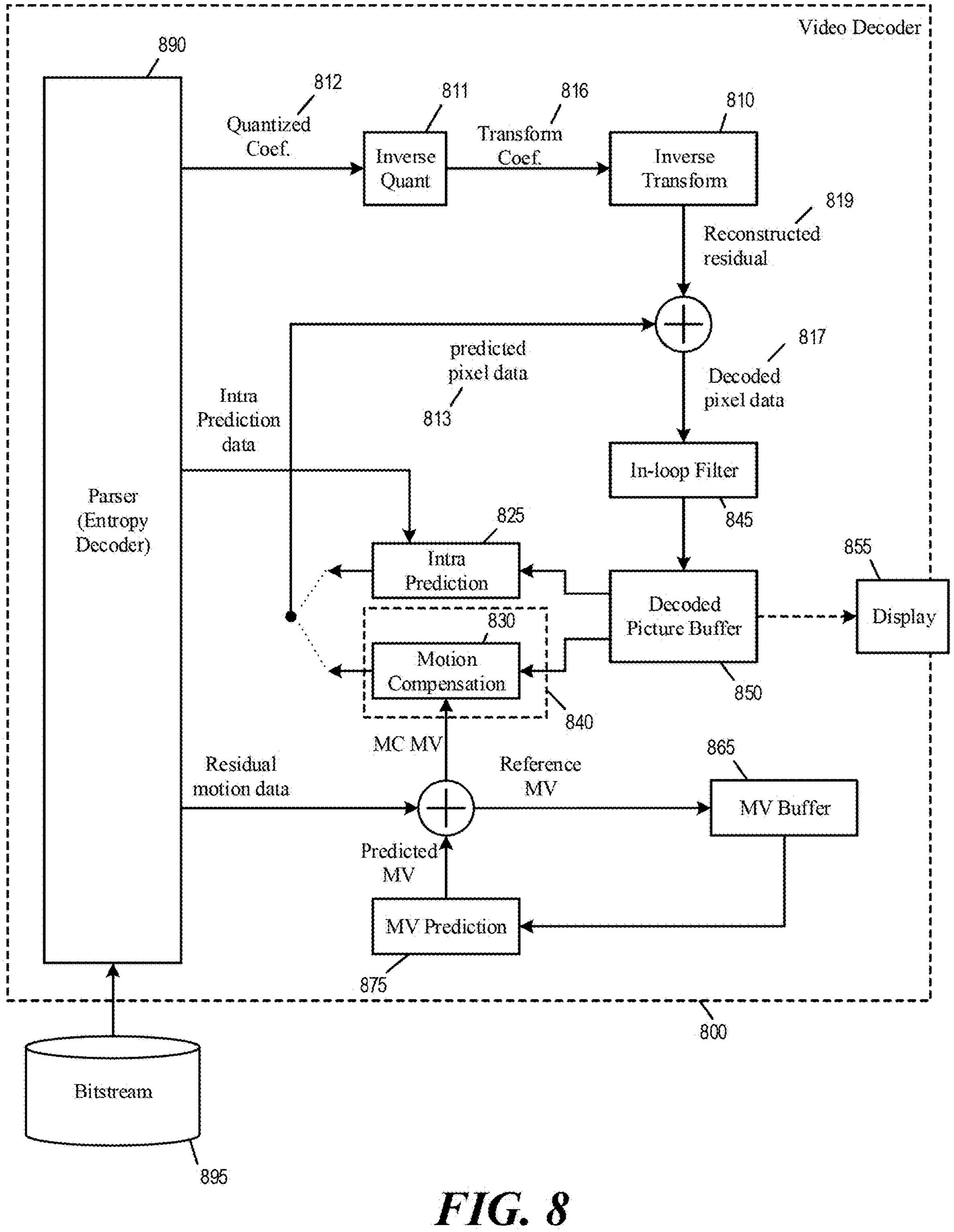
FIG. 8 illustrates an example video decoder that may implement block partitioning.

FIG. 8 illustrates an example video decoder 800 that may implement block partitioning. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including some components selected from an inverse quantization module 811, an inverse transform module 810, an intra-prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 811 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra-prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra-prediction module 825 receives intra-prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly, or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering or smoothing operations performed by the in-loop filter 845 include deblock filter (DBF), sample adaptive offset (SAO), and/or adaptive loop filter (ALF).

Figure 9:
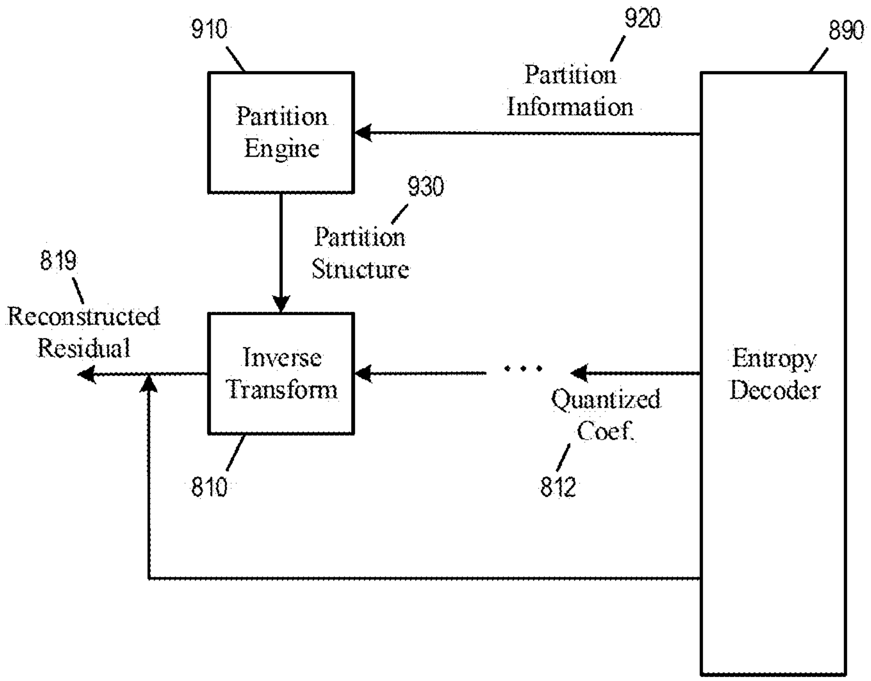
FIG. 9 illustrates portions of the video decoder that implement block partitioning based on localized partitioning constraint.

FIG. 9 illustrates portions of the video decoder 800 that implement block partitioning based on localized partitioning constraint. A partition engine 910 receives a set of partitioning information 920 from the entropy decoder 890. The entropy decoder 890 receives the set of partitioning information 920 as syntax elements from the bitstream 895 at different levels of video hierarchy (e.g., sequence, picture, slice, block). The partition engine 910 also provide partitioning structure 930 to the inverse transform module 810 so the inverse transform module may perform inverse transform operations on the quantized coefficients 812 to generate the reconstructed residual 819 according to the partitioning structure 930.

The partition engine 910 may apply various partitioning constraints such as maximum depths for MTT, TT, BT, QT, etc. The partitioning operations performed by the partitioning engine 910 are subject to these partitioning constraints. The partitioning constraints are localized or adapted to individual LCUs of the current picture. The localized partitioning constraints are provided as part of the partition information 920, which are based on syntax elements parsed from the bitstream 895 by the entropy decoder 890.

Figure 10:
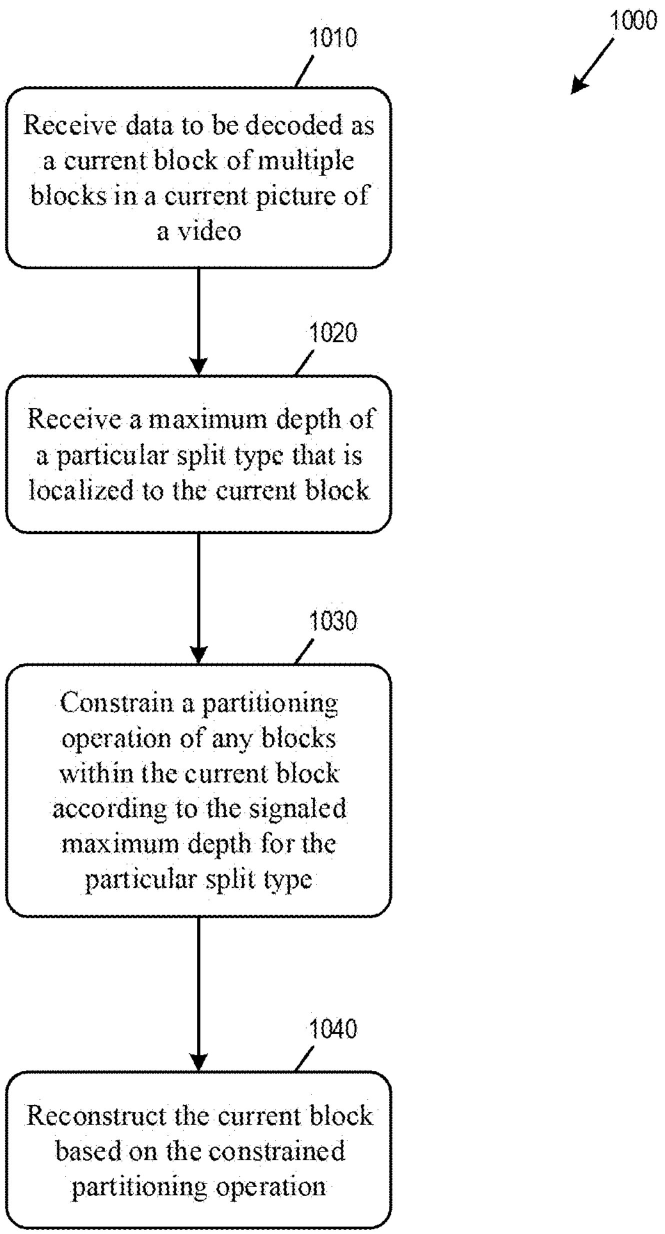
FIG. 10 conceptually illustrates a process that perform block partitioning based on localized partitioning constraints.

FIG. 10 conceptually illustrates a process 1000 that perform block partitioning based on localized partitioning constraints. In some embodiments, one or more processing units (e.g., a processor) of a computing device implementing the decoder 500 performs the process 1000 by executing instructions stored in a computer readable medium. In some embodiments, an electronic apparatus implementing the decoder 500 performs the process 1000.

The decoder receives (at block 1010) data to be decoded as a current block of a plurality of blocks in a current picture of a video. The current block maybe a coding tree unit (CTU). The current block may also be a local control unit (LCU).

The decoder receives (at block 1020) a maximum depth of a particular split type that is localized to the current block. The particular split type is one of quad-tree (QT) splitting, multi-type tree (MTT) splitting, ternary-tree (TT) splitting, and binary-tree (BT) splitting. In some embodiments, the maximum depth of the particular split type is one of a set of constraints that are adaptive to different LCUs in the current picture.

The decoder constrains (at block 1030) a partitioning operation of any of a plurality of blocks within the current block according to the received maximum depth for the particular split type. The partitioning operation is a split operation of the particular split type, such that the split operation is disallowed when the maximum depth for the particular split type is reached.

In some embodiments, when the maximum depth for the particular split type is reached at a current split-partition of the current block (e.g., a QT node or a MTT node), further splitting by the particular split type is inferred to be disabled for the current split-partition and a syntax element for selecting the particular split type is bypassed for the current split-partition. For example, when the particular split type is QT splitting and the maximum depth for the QT splitting is reached at a current split-partition, a syntax element for splitting the current split-partition into QT partitions is bypassed and inferred to be disallowing the splitting.

In some embodiments, when a maximum depth for MTT splitting is zero, a syntax element for splitting a current split partition of the current block the current block into QT partitions (e.g., split_qt_flag) is bypassed and inferred to activate the QT splitting when the current split-partition is determined to be further split. In some embodiments, when the particular split type is MTT splitting and a maximum depth for MTT splitting is reached for a current split-partition, a syntax element for splitting the current split-partition into multiple partitions is bypassed and inferred to be disallowing the splitting. In some embodiments, when a current depth of MTT splitting is greater than zero in the current block, a syntax element for indicating maximum BT or TT depth for the current block is received. In some embodiments, a flag for selecting between BT or TT splitting (e.g., mtt_split_cu_binary_flag) is bypassed when a maximum depth of BT or TT is reached at a current split partition of the current block.

In some embodiments, when a current depth of MTT splitting is greater than zero in the current block, a syntax element for indicating whether vertical or horizontal splitting is allowed (e.g., mtt_split_cu_vertical_flag) is received. In some embodiments, the syntax element for indicating MTT vertical or horizontal splitting is bypassed when vertical splitting or horizontal splitting of a current split partition is not allowed for the current block.

In some embodiments, after a MTT splitting is encountered or performed for the current block, the decoder receives a syntax element (e.g., ctu_used_tt_flag) to indicate whether ternary tree (TT) splitting is used or allowed in the current block. In some embodiments, when TT splitting is indicated by the syntax element (e.g., ctu_used_tt_flag) to not be used for the current block, a flag for indicating whether to perform binary tree (BT) splitting (e.g., mtt_split_cu_binary_flag) is bypassed.

The decoder reconstructs (at block 1040) the current block based on the constrained partitioning operation. The decoder may then provide the reconstructed current block for display as part of the reconstructed current picture.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
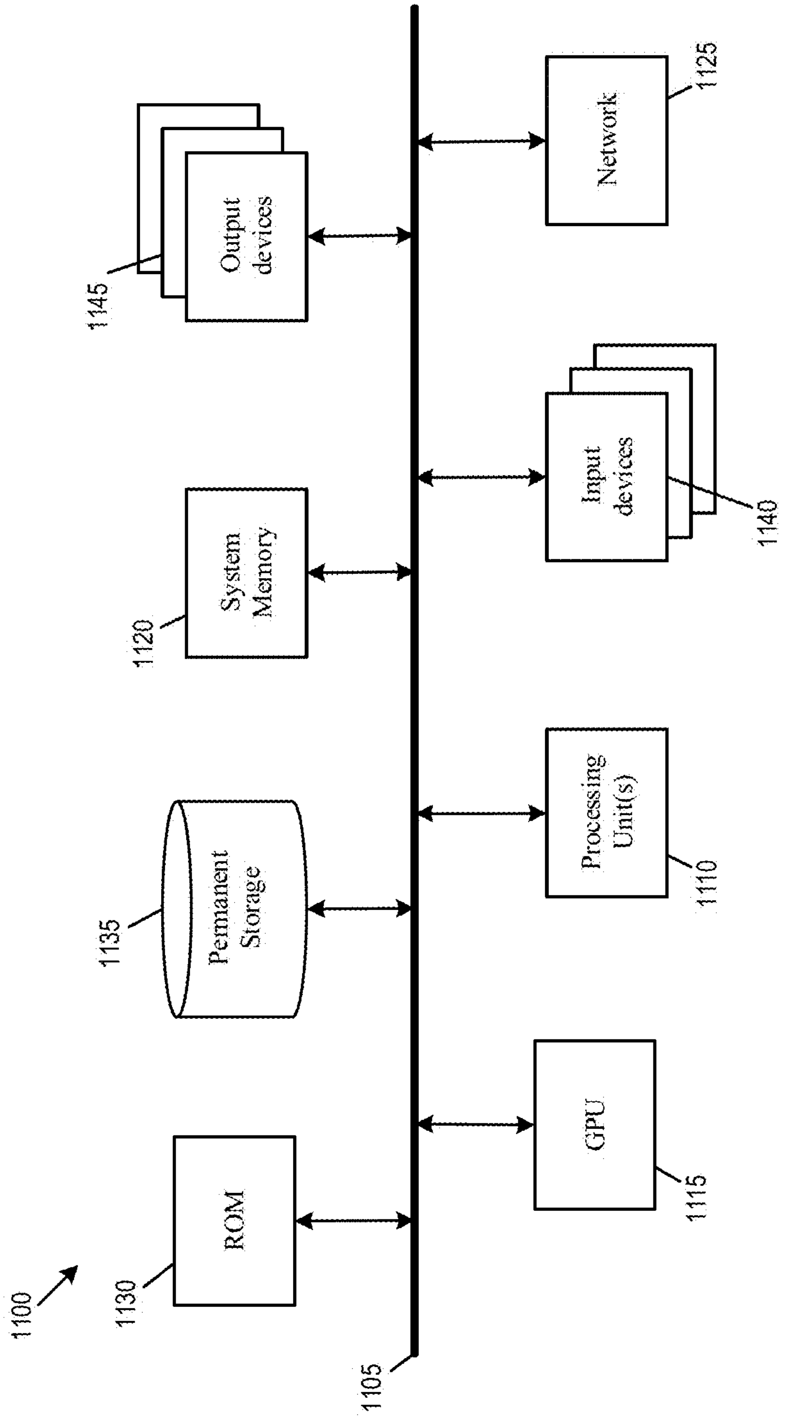
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 7 and FIG. 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data to be encoded or decoded as a current block of a plurality of blocks in a current picture of a video;

encoding or decoding one or more syntax elements in the current block to indicate a maximum depth of a particular split type that is allowed for splitting the current block, wherein the particular split type is one of quad-tree (QT) splitting, ternary-tree (TT) splitting, and binary-tree (BT) splitting;

constraining a partitioning operation of any of a plurality of blocks within the current block according to the indicated maximum depth for the particular split type; and encoding or decoding the current block based on the constrained partitioning operation.

2. The video coding method of claim 1, wherein the current block is a coding tree unit (CTU).

3. The video coding method of claim 1, wherein the current block is a local control unit (LCU), wherein the maximum depth of the particular split type is one of a set of constraints that are adaptive to different LCUs in the current picture.

4. The video coding method of claim 1, wherein the partitioning operation comprises a split operation of the particular split type, wherein the split operation is disallowed when the maximum depth for the particular split type is reached.

5. The video coding method of claim 1, wherein when the maximum depth for the particular split type is reached at a current split-partition of the current block, further splitting by the particular split type is inferred to be disabled for the current split-partition and a syntax element for selecting the particular split type is bypassed for the current split-partition.

6. The video coding method of claim 1, wherein when the particular split type is quad-tree (QT) splitting and the maximum depth for the QT splitting is reached at a current split-partition, a syntax element for splitting the current split-partition into quad-tree (QT) partitions is bypassed and inferred to be disallowing the splitting.

7. The video coding method of claim 1, wherein when a maximum depth for multi-type tree (MTT) splitting is zero, a syntax element for splitting a current split-partition of the current block into quad-tree (QT) partitions is bypassed and inferred to activate the QT splitting when the current split-partition is determined to be further split.

8. The video coding method of claim 1, wherein when the particular split type is multitype-tree (MTT) splitting and a maximum depth for MTT splitting is reached for a current split-partition, a syntax element for splitting the current split-partition into more than one partitions is bypassed and inferred to be disallowing the splitting.

9. The video coding method of claim 1, wherein when a depth of multi-type tree (MTT) splitting is greater than zero, a syntax element for indicating maximum binary tree (BT) or ternary tree (TT) depth for the current block is signaled.

10. The video coding method of claim 1, wherein a flag for selecting between binary tree (BT) or ternary tree (TT) splitting is bypassed when a maximum depth of binary tree (BT) or ternary tree (TT) is reached at a current split partition of the current block.

11. The video coding method of claim 1, wherein when a depth of multi-type tree (MTT) splitting is greater than zero in the current block, a syntax element for indicating whether vertical or horizontal splitting is allowed in the current block is signaled.

12. The video coding method of claim 11, wherein the syntax element for indicating multi-type tree (MTT) vertical or horizontal splitting is bypassed when vertical splitting or horizontal splitting of a current split-partition is not allowed for the current block.

13. The video coding method of claim 1, further comprising, after a multi-type tree (MTT) splitting is encountered for the current block, signaling or receiving a syntax element to indicate whether ternary tree (TT) splitting is used or allowed in the current block.

14. The video coding method of claim 13, wherein when TT splitting is indicated by the syntax element to not be used for the current block, a flag for indicating whether to perform binary tree (BT) splitting is bypassed.

15. An electronic apparatus comprising:

a video coder circuit configured to perform operations comprising:

receiving data to be encoded or decoded as a current block of a plurality of blocks in a current picture of a video;

encoding or decoding one or more syntax elements in the current block to indicate a maximum depth of a particular split type that is allowed for splitting the current block, wherein the particular split type is one of quad-tree (QT) splitting, ternary-tree (TT) splitting, and binary-tree (BT) splitting;

constraining a partitioning operation of any of a plurality of blocks within the current block according to the indicated maximum depth for the particular split type; and encoding or decoding the current block based on the constrained partitioning operation.

16. A video decoding method comprising:

receiving data to be decoded as a current block of a plurality of blocks in a current picture of a video;

decoding one or more syntax elements in the current block to indicate a maximum depth of a particular split type that is allowed for splitting the current block, wherein the particular split type is one of quad-tree (QT) splitting, ternary-tree (TT) splitting, and binary-tree (BT) splitting;

constraining a partitioning operation of any of a plurality of blocks within the current block according to the indicated maximum depth for the particular split type; and reconstructing the current block based on the constrained partitioning operation.

* * * * *